(No Model.) 2 Sheets—Sheet 1.

J. H. CILLEY.
VELOCIPEDE.

No. 358,730. Patented Mar. 1, 1887.

Witnesses
Fred G. Dieterich
Wm. E. Dyre

Inventor
J. H. Cilley
By his Attorneys
Johnston, Reinohl & Dyre

N. PETERS, Photo-Lithographer, Washington, D. C.

(No Model.) 2 Sheets—Sheet 2.

J. H. CILLEY.
VELOCIPEDE.

No. 358,730. Patented Mar. 1, 1887.

UNITED STATES PATENT OFFICE.

JOHN H. CILLEY, OF LEBANON, PENNSYLVANIA.

VELOCIPEDE.

SPECIFICATION forming part of Letters Patent No. 358,730, dated March 1, 1887.

Application filed August 6, 1886. Serial No. 210,227. (No model.)

*To all whom it may concern:*

Be it known that I, JOHN H. CILLEY, a citizen of the United States, residing at Lebanon, in the county of Lebanon and State of Pennsylvania, have invented certain new and useful Improvements in Tandem Velocipedes; and I do hereby declare the following to be a full, clear, and exact description of the invention, such as will enable others skilled in the art to which it appertains to make and use the same.

My invention relates to velocipedes of the three-track style, and has for its object the improvement of the machine shown and described in my patent of October 20, 1885, No. 328,761.

The improvement has special reference to reducing the weight of the frame, changing the position of the seats, to afford ready access to the rear seat, and to enable the rear rider to see in front of the machine, the brake mechanism, and simplifying the steering apparatus.

The invention will be hereinafter described, and particularly pointed out in the claims.

Figure 1:
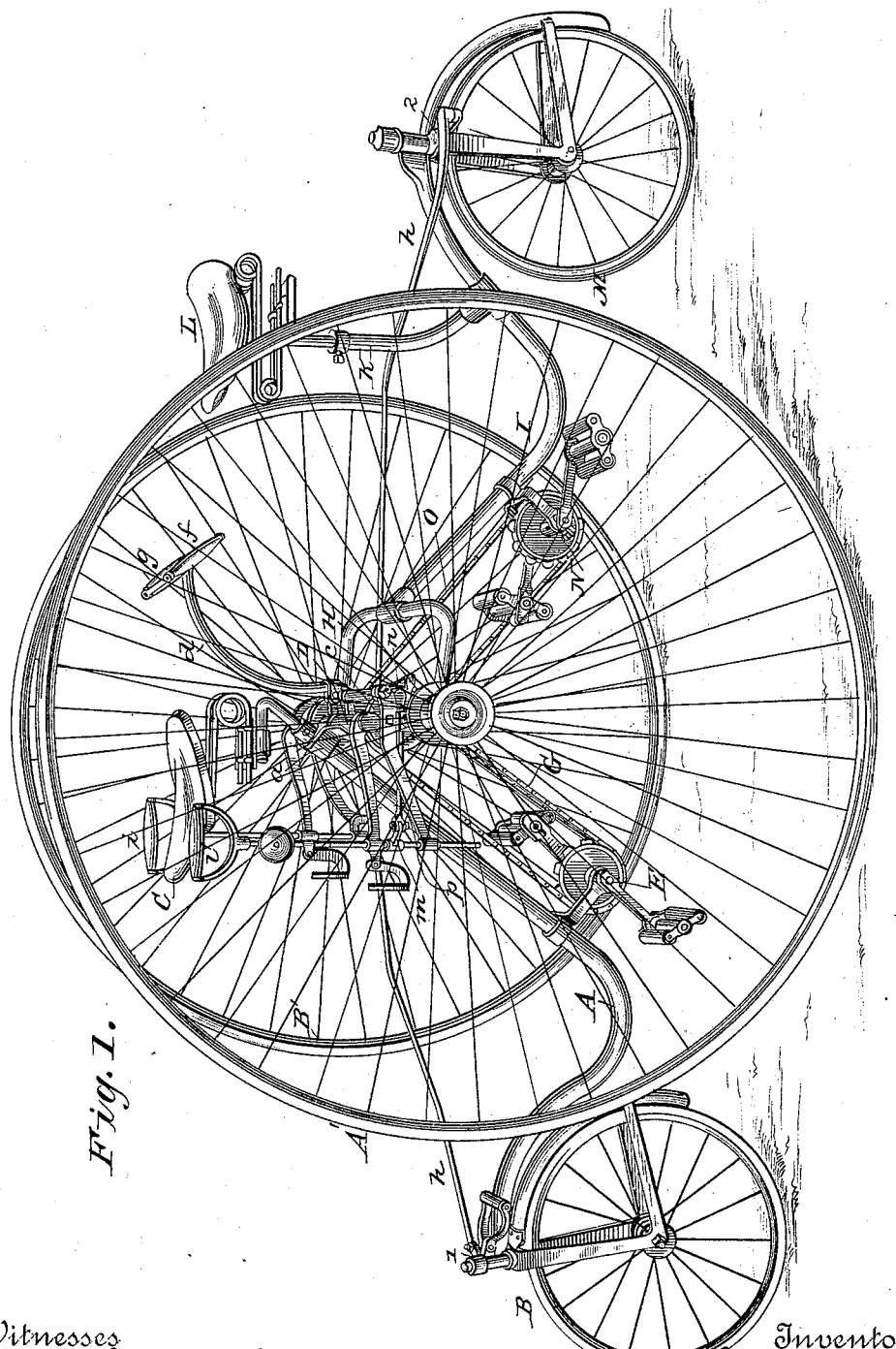
Figure 2:
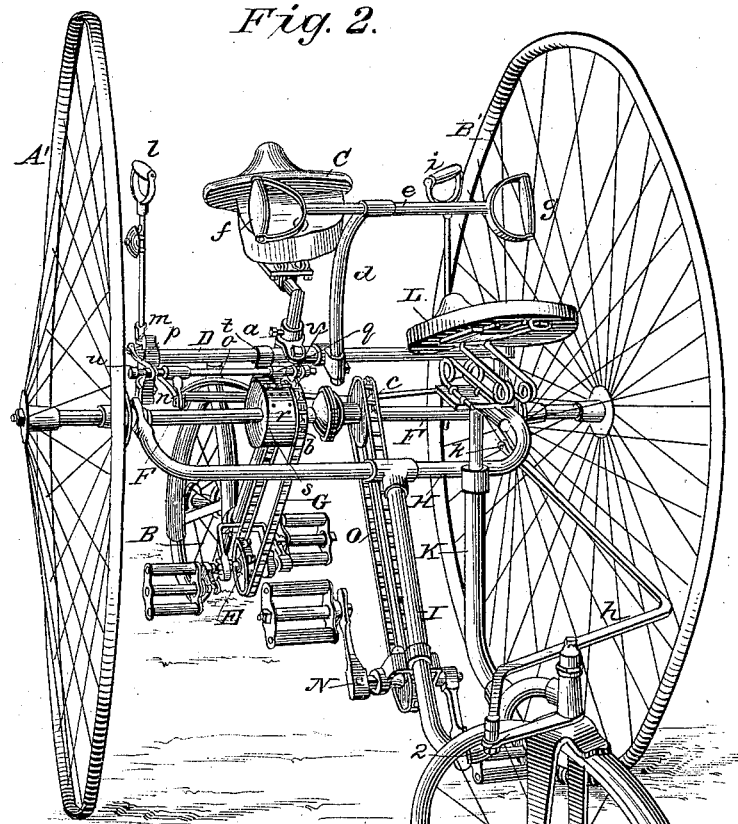
Figure 3:
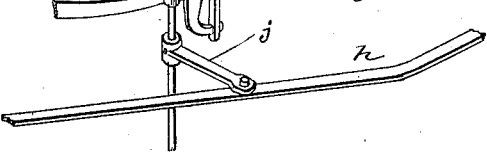
Figure 4:
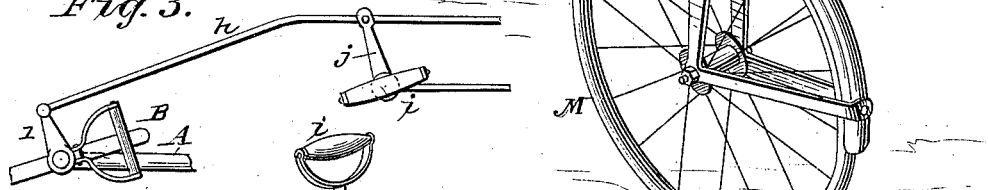

In the accompanying drawings, which form a part of this specification, Figure 1 represents a side view; Fig. 2, a rear view; Fig. 3, a plan of the connection between one of the handles and the steering-rod, and Fig. 4 a side view of the same.

Reference being had to the drawings and the letters marked thereon, A represents the front frame provided with a steering-wheel, B, and a seat, C, for the front rider, and is secured to the rod D, a little to one side of its median line, by a clip, $a$. To the frame A is attached the pedal-crank axle E, connected to a sprocket-wheel, $b$, on the axle F, by a chain belt, G.

A' B' represent the driving-wheels secured to the axle in the usual manner.

H represents the rear frame, which is clipped to the ball-bearings on the axle, as in my former patent, and need not, therefore, be more particularly herein described. Instead of continuing the frame rearwardly by side bars, I attach a spine, I, to the frame H a little to one side of its median line and on the opposite side as compared with the connection of the front frame with the rod D.

To the spine I is attached a standard, K, which supports a seat, L, for the rear rider, and a wheel, M, which corresponds and tracks with the front wheel, B. The standard for the rear seat is brought back from the axle as far as convenient, to afford ready access to the seat for the rear rider.

By arranging the frames to which the seats are attached on opposite sides of the center of the axle the seats are thrown out of line, and the rear rider has an unobstructed view of the road in front of the machine, which not only affords the pleasure of seeing the objects along the line of travel, but enables the rider to apprehend any approaching danger incident to bad places in the road—such as obstructions, gullies, or approaching vehicles. Furthermore, by placing both seats out of the median line of the machine it (the machine) is evenly balanced and runs true and smooth. The rear frame is also provided with a pedal-crank axle, N, which is connected to a sprocket-wheel, $c$, on the axle F by a chain belt, O.

To the rod D is secured a standard, $d$, through an eye, in the upper end of which passes a rod, $e$, having handles $f$ $g$, formed thereon for the support of the rear rider.

The front and rear wheels, B and M, are connected by a rod, $h$, attached to arms 1 2, and said rod is connected to the right handle, $i$, of the main machine by an arm, $j$, by which said rod is operated and the machine steered. The rod $h$ is provided with a lap-joint at $k$, to accommodate the rise and fall of the frame. By connecting the front and rear wheels they are caused to run in the same track, and the machine can be turned in a very small space; and the simplified form of connection between the handle and the steering-rod makes a very convenient and efficient mechanism at a great reduction in the cost of construction.

To the left handle, $l$, is attached a lever, $m$, which is connected to a lever, $n$, of shaft $o$ by a rod, $p$, and to the arm $q$ of said shaft is attached one end of a band, $r$, which partly surrounds a friction-wheel, $s$, on the main axle, and is secured at its opposite end to the rod D at $t$, to form a brake.

The shaft $o$ is supported in brackets $w$ $v$, as shown in Fig. 2. By this construction the front rider has complete control of the steering and the speed of the machine, and is not required to change the position of his left arm, but may apply the brake by simply turning his hand, thus applying the band $r$ to the wheel $s$ on the axle F.

By attaching the rear frame to the axle F near the wheels, as shown, the machine is made very stiff and is less liable to upset in making short turns, as the weight of the rear rider keeps the wheels to the ground, and the frame H forms a convenient support for the feet of the rear rider when he is not applying them to the pedals of the machine.

By the construction shown the weight of the machine has been greatly reduced as compared with that shown in my Patent No. 328,761, (a very light frame having been substituted.) While some of the principal features of the original machine have been retained, ample room has been afforded for the rear rider to mount and dismount, and the greatest objection to the tandem velocipede as heretofore constructed (namely, that the view of the rear rider has always been obstructed by the front rider) removed.

My invention may be applied to different forms and styles of tricycles by slight mechanical changes without departing from its spirit; and I do not, therefore, limit myself in its application to the style shown in the drawings.

Having thus fully described my invention, what I claim is—

1. A tandem velocipede having spines in front and rear of the axle on opposite sides of the median line of the machine, in combination with seats supported by said spines out of longitudinal line with each other, substantially as and for the purpose set forth.

2. A tandem velocipede having a detachable swinging rear frame provided with a seat supported on a standard arranged to one side of the median line of the machine, substantially as described.

3. A tandem velocipede having a front fixed frame consisting of a spine secured to one side of the median line of the machine and a rear swinging frame supporting a seat out of line with the front seat, substantially as described.

4. A tandem velocipede having a bifurcated rear frame detachably secured to the axle in close proximity to the driving-wheels and provided with a spine attached out of the median line of the machine and supporting a saddle, substantially as described.

5. A tandem velocipede having front and rear steering-wheels connected by a jointed rod, in combination with a steering-handle and an arm connecting the rod and the handle-bar, substantially as described.

In testimony whereof I affix my signature in presence of two witnesses.

JOHN H. CILLEY.

Witnesses:
   JOHN R. RODEARMEL,
   TOBIAS REINOEHL, Jr.